(12) United States Patent
Borresen et al.

(10) Patent No.: US 7,380,164 B2
(45) Date of Patent: *May 27, 2008

(54) FAIL-OVER SUPPORT FOR LEGACY VOICE MAIL SYSTEMS IN NEW WORLD IP PBXS

(75) Inventors: Lars Borresen, Santa Clara, CA (US); Sudhakar Valluru, San Jose, CA (US); William Davids, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 11/367,264

(22) Filed: Mar. 3, 2006

(65) Prior Publication Data

US 2006/0174159 A1 Aug. 3, 2006

Related U.S. Application Data

(63) Continuation of application No. 09/921,869, filed on Aug. 2, 2001, now Pat. No. 7,032,129.

(51) Int. Cl.
*G06F 11/00* (2006.01)

(52) U.S. Cl. .................. 714/13; 361/788; 379/9.05; 379/93.09

(58) Field of Classification Search .................. None
See application file for complete search history.

(56) References Cited

U.S. PATENT DOCUMENTS 6,192,437 B1 2/2001 Oka et al.
6,594,776 B1 7/2003 Karighattam et al.
6,675,250 B1 1/2004 Ditner et al.
6,932,617 B2 8/2005 Debord et al.
7,032,129 B1 4/2006 Borresen et al.
2003/0005357 A1 1/2003 Alexander et al.
2004/0148448 A1 7/2004 Wachel
2004/0162919 A1 8/2004 Williamson et al.

OTHER PUBLICATIONS

Cisco Integrated Communications System 7750 Data Sheet, Copyright 2000, pp. 1-12, USA.

*Primary Examiner*—Marc Duncan
(74) *Attorney, Agent, or Firm*—Sierra Patent Group, Ltd.

(57) ABSTRACT

An Integrated Communication System (ICS) with fail-over serial data connectivity is disclosed. In one aspect, an ICS may comprise a chassis including a System Switch Processor (SSP) for providing connectivity to a plurality of slots. A Serial Alarm Processor (SAP) may be operatively coupled to the ICS through one of the slots, an include at least one serial port for providing serial data connectivity. A Primary Single Board Computer (SBC) and at least one secondary SBC may be disposed in the slots. The ICS may be configured to pass control of serial data connectivity from the Primary SBC to a secondary SBC in the event of the failure of the Primary SBC. Various methods for fail-over serial data connectivity are also disclosed.

8 Claims, 7 Drawing Sheets

FAIL-OVER SUPPORT FOR LEGACY VOICE MAIL SYSTEMS IN NEW WORLD IP PBXS

CROSS REFERENCE TO RELATED APPLICATION

This application is a continuation of U.S. patent application Ser. No. 09/921,869, filed Aug. 2, 2001 now U.S. Pat. No. 7,032,129, which is hereby incorporated by reference as if set forth herein.

BACKGROUND

1. Field of the Disclosure

The disclosure relates generally to data communications, and in particular, to providing support for legacy systems for New World IP PBXs.

2. The Prior Art

Many enterprises are increasingly depending on branch-offices to extend their reach to customers and offer a more personalized level of service. One solution is to adopt many of the modern "New World" IP PBXs which incorporate voice, data, and fax using Internet Protocol (IP) technologies. However, with current legacy PBX equipment and separate voice and data networks, enterprises face fundamental application and communication integration challenges in deployment, operations, support, and maintenance of these branch-office systems. Older, or legacy systems, such as the traditional telephone system, typically are not compatible with the newer IP-based technologies. Thus, many of these branch-offices may appear as "islands" of information and employees, with reduced communications access to other employees and resources within the remote main enterprise office.

Thus, to integrate traditional voice mail systems into newer IP-based PBXs provide connectivity to traditional phone systems, serial lines (RS232) are typically used for signaling between the Call Processing component of the IP PBX and the voice mail system.

However, since serial line interfaces require peer-to-peer connectivity, a failure in any one component requires physical intervention to return the system to service, such as moving a cable to another backup or secondary system. For High Availability and mission-critical systems such as IP PBXs, this requirement is not acceptable.

The prior art has proposed workarounds which are typically expensive, non-scalable, or awkward to implement.

Hence, there is a need for a unified solution which provides support for both newer IP-based technologies and legacy systems, and provides fail-over support.

SUMMARY

An Integrated Communication System (ICS) with fail-over serial data connectivity is disclosed. In one aspect, an ICS may comprise a chassis including a System Switch Processor (SSP) for providing connectivity to a plurality of slots. A Serial Alarm Processor (SAP) may be operatively coupled to the ICS through one of the slots, and include at least one serial port for providing serial data connectivity. A Primary Single Board Computer (SBC) and at least one secondary SBC may be disposed in the slots. The ICS may be configured to pass control of serial data connectivity from the Primary SBC to a secondary SBC in the event of the failure of the Primary SBC. Various methods for fail-over serial data connectivity are also disclosed.

BRIEF DESCRIPTION OF THE DRAWING FIGURES

DETAILED DESCRIPTION

Figure 1:
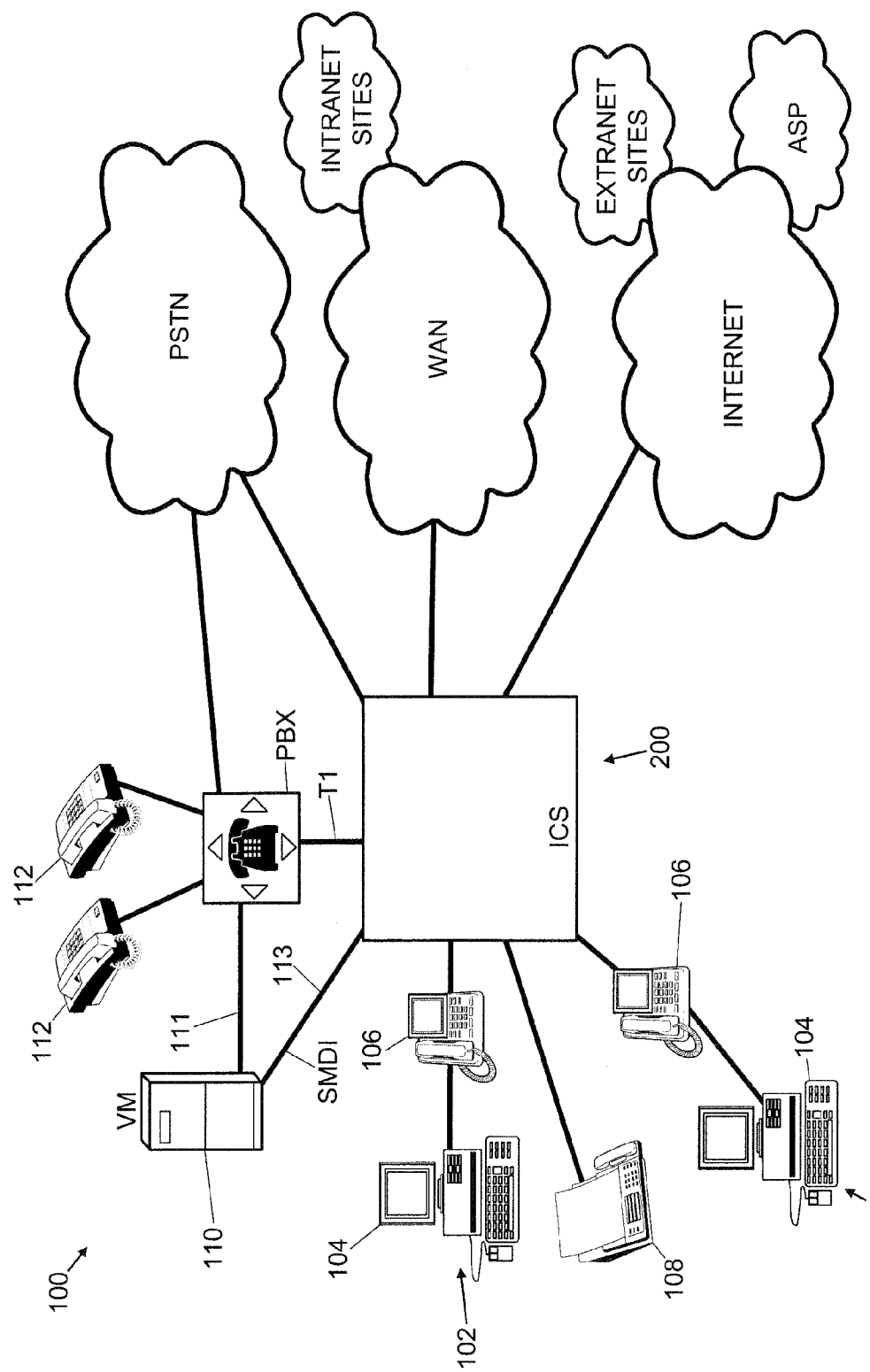
FIG. 1 is schematic diagram of a communication system configured in accordance with the teachings of this disclosure.

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

This disclosure may relate to data communications. Various disclosed aspects may be embodied in various computer and machine readable data structures. Furthermore, it is contemplated that data structures embodying the teachings of the 10 disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Accordingly, the representation of various aspects of the present disclosure through the use of flowcharts should not be used to limit the scope of the present disclosure.

System Overview

FIG. 1 is schematic diagram of a communication system 100 configured in accordance with the teachings of this disclosure. The system 100 includes an Integrated Communication System (ICS) 200 for integrating all aspects of the system 100 as will be described in more detail below.

The ICS 200 may be operatively coupled to one or more branches for providing IP connectivity, such as branches 102 and 103. Examples of equipment which may be coupled to branches 102 and 103 include a personal computer 104 and an IP telephone 106. A facsimile machine 108 may also be operatively coupled to the ICS 200.

Typically, branches 102 and 103, and facsimile 108 will be located at the same location as the ICS 200. To provide connectivity to the outside world, the ICS 200 may also be operatively coupled to the Internet, thereby providing connectivity to Extranet partners and Application Service Providers ("ASP"). The ICS 200 may also be operatively coupled to a WAN for providing connectivity to enterprise-wide Intranet sites. It is contemplated that the ICS 200 may also be operatively coupled to other packet-based networks as are known in the art.

Of particular relevance to the present disclosure is the desire to provide reliable connectivity between the IP-based New World business solutions and legacy business applications, such as voice mail (VM).

To provide connectivity to legacy applications, the ICS 200 may also be operatively coupled to a legacy PBX through a T1 line, or through the Public Switched Telephone Network (PSTN). Through such interfaces, connectivity may be provided to one or more POTS (Plain Old Telephones) 112. Additionally, the ICS may attach to POTS through its own connectivity solutions, and thus other intermediaries may not necessary.

Voice Mail is an important legacy application among others which must be supported as an enterprise migrates towards IP-based New World applications. Often, Voice Mail is provided by a Voice Mail server, such as VM server 110, typically a personal computer hosting a VM server application. VM server 110 is typically operatively coupled to the PBX through a serial interface 111 providing connectivity through a serial protocol such as RS232.

To provide Voice Mail connectivity to the IP-based areas of the system 100, the ICS 200 may be operatively coupled to the VM server 110 through a Simplified Message Desk Interface ("SMDI") link 113.

ICS Overview

Figure 2:
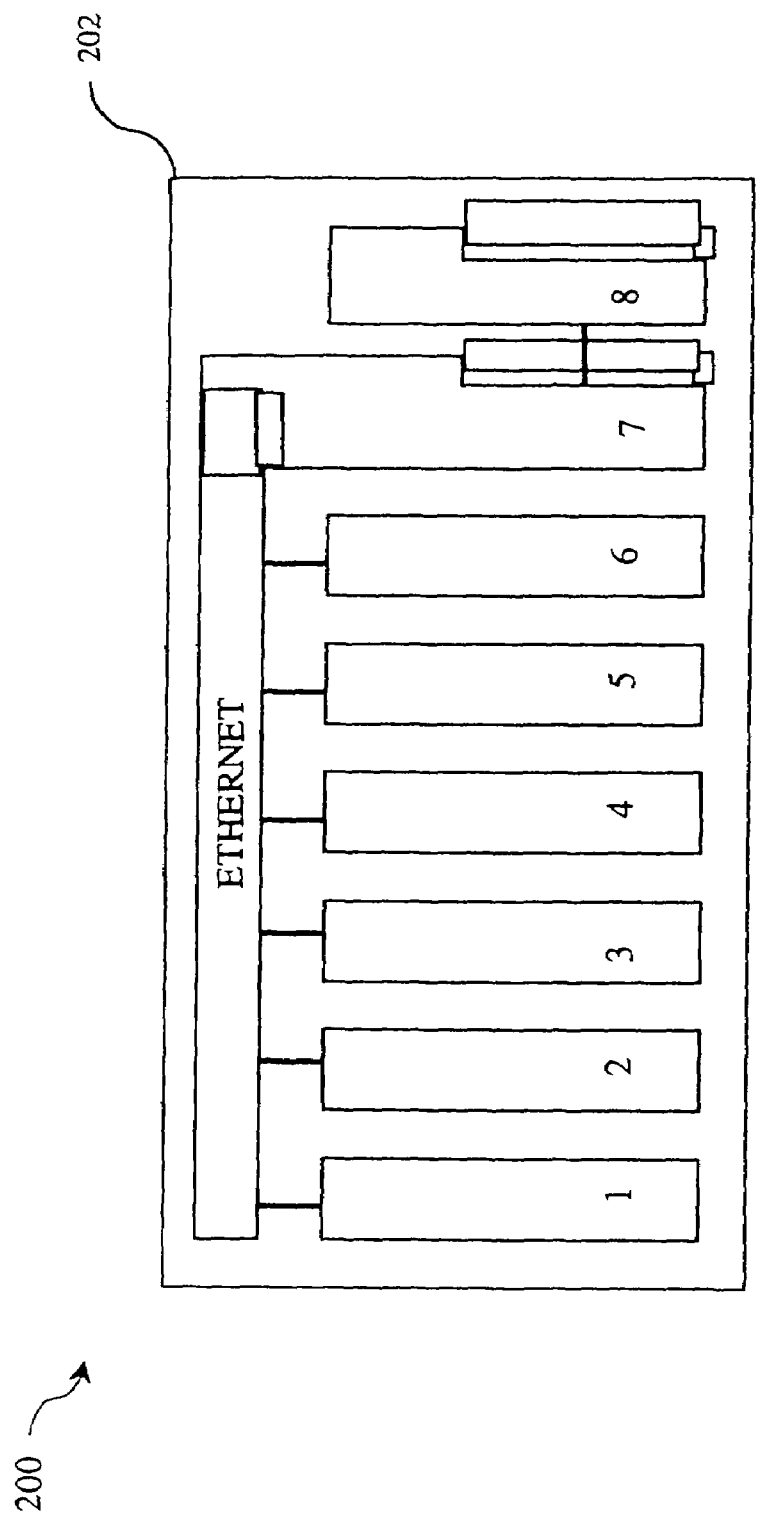
FIG. 2 is a block diagram of an ICS configured in accordance with this 5 disclosure.

FIG. 2 is a block diagram of an ICS 200 configured in accordance with this disclosure. FIG. 2 shows one aspect of an ICS 200 which includes a chassis 202 for housing cards as described below. The chassis 202 may include hardware standard in the art such as power supplies and fans (not shown) for providing power and temperature control.

FIG. 2 shows a representation of an one aspect of ICS chassis 200 having eight card slots numbered 1-8 for accepting blade-style cards. In one aspect, the cards comprise Compact-PCI-compliant cards. Other configurations are possible with differing numbers and types of slots.

The first six card slots numbered 1 through 6 may interchangeably house various cards selected by the user. In one embodiment, slots 1-6 preferably house one of two types of cards, including multiservice route processor cards ("MRP") and a system processing engine cards ("SPE"). Preferably, there may be at least one of each.

A MRP is a voice and data capable router for carrying voice traffic over an IP network. MRP cards can thus link small to medium size remote Ethernet LANs to central offices over WAN links as depicted in FIG. 1. A MRP may have slots that support WAN interface cards ("WICs"), voice WAN interface cards ("VWICs"), and voice interface cards ("VICs").

A MRP may also have user configurable modules including, but not limited to, packet voice data module ("PVDM") slots for adding digital signal processors ("DSPs"); a dual inline memory module ("DIMM") slot for upgrading MRP memory; and a socket for a Virtual Private Network ("VPN") module.

A SPE is a single board computer that runs system software applications such as Cisco Systems, Inc.'s ICS 7700 System Manager and Cisco Systems, Inc. CallManager. Many types of SPEs may be manufactured by Cisco Systems, Inc., and other manufacturers which may be installed in slots 1 through 6. Typically, a SBC is configured to run an operating system such as Microsoft Windows®, and thus may include processor, a hard disk drive, memory, a keyboard port, universal serial bus ("USB") ports, and a video port.

As will be appreciated by those skilled in the art, the main difference between a MRP and an SPE is that the MRP is designed to provide primarily routing functions to the ICS, while the SPE brings the functionality of a personal computer 15 to the ICS. Thus, the SPE is typically referred to as a Single Board Computer ("SBC"), and will be so referred to throughout the remainder of this disclosure. SBCs are also known as "PC blades."

SBCs may also provide other application functionality, such as VM, unified messaging, and other core voice applications. Other equipment, such as UPS (uninterruptible power supplies) may have serial interfaces to the SBC.

In one aspect of a disclosed ICS, there will be at least one SBC card installed in one of the slots of the chassis 202.

Slot 7 may be dedicated to a system switch processor ("SSP") for providing connectivity between the various slots of the chassis 202. In a preferred embodiment, the SSP comprises an Ethernet switch that passes data among all cards in the ICS chassis 202 and to any other Ethernet switches connected to the system by providing a 10/100BaseT autosensing data switch backplane. The SSP may also provide quality of service (QoS) functionality, and form a single switched communication network.

Slot 8 may be dedicated to a system alarm processor card ("SAP") which monitors the status of the chassis, power supply modules, and fans, and feeds real-time data to the SPEs. The SAP may monitor the operational status of each component of the ICS 200, and may remotely alert system administrators of any environmental, functional, or operational problems detected within the ICS 200.

SAP Overview

Figure 3:
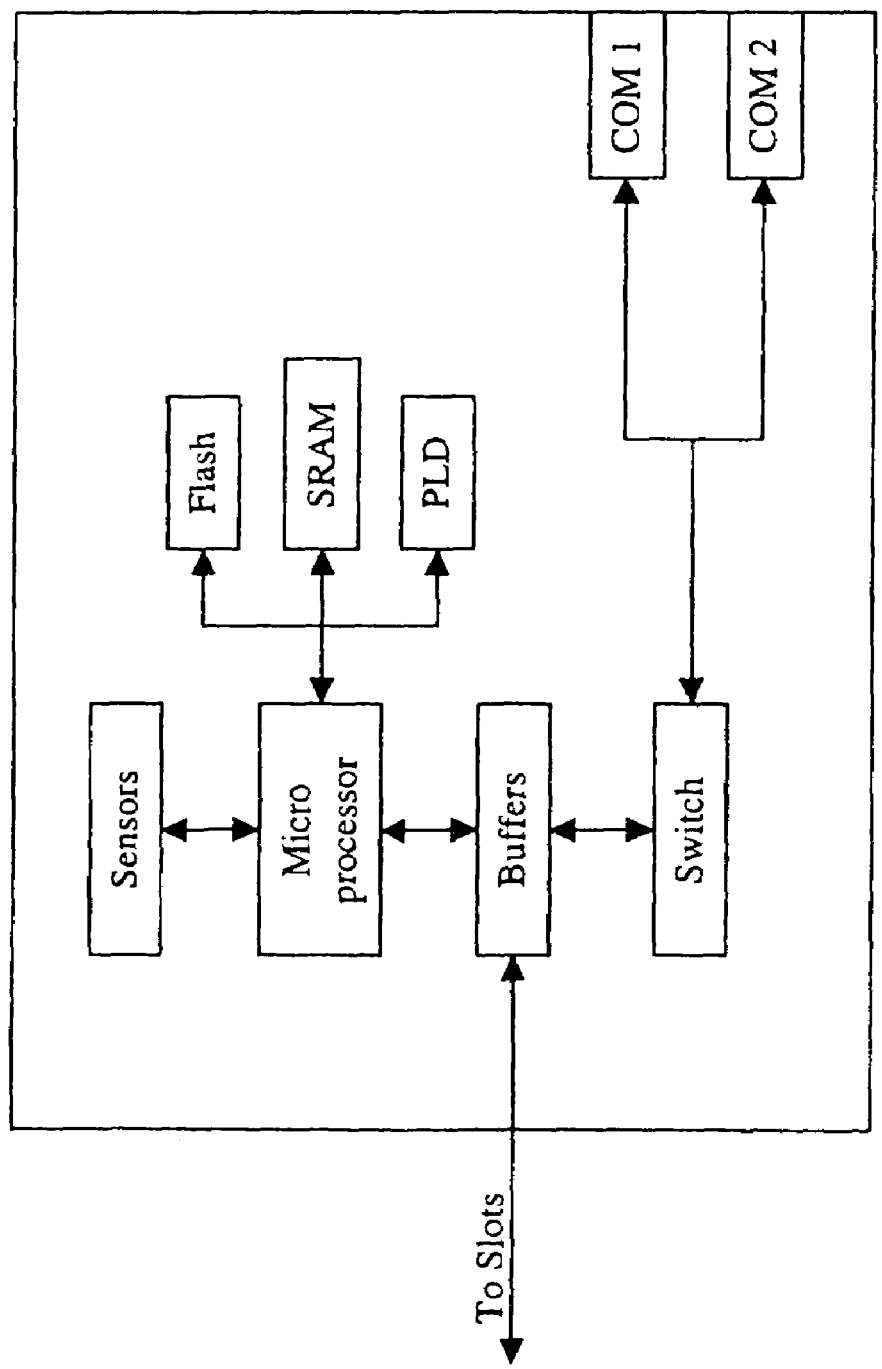
FIG. 3 is a schematic diagram of one aspect of a SAP configured in accordance with this disclosure.

FIG. 3 is a schematic diagram of one aspect of a SAP configured in accordance with this disclosure. The SAP may include a conventional microprocessor and associated memory, such as FLASH RAM and SRAM for the storage and retrieval of code and data. It is contemplated that any conventional microprocessor may be used in a SAP of the present disclosure. In a preferred embodiment, an INTEL 80C186XL 16-bit processor is used, with the SRAM functioning as a scratch pad. The FLASH memory may be used for program execution with a write protect for the boot ROM area.

The SAP may further include a programmable logic device (PLD) coupled to the microprocessor for the storage and retrieval of program instructions. The PLD may comprise a EEPROM programmable through register bits.

The SAP may be configured to communicate with the other slots of the ICS through conventional parallel data transfer. The SAP may communicate with other slots using a serial RS-232 slot-to-SAP backplane interface. An additional RS-232 external interface may be provided on the front panel (not shown) for console interface to all slots.

As mentioned above, one of the benefits provided by an ICS of the present disclosure is the ability to communicate with legacy applications using serial protocols. To this end, at least one serial port may be provided on the SAP. In a preferred embodiment, two serial ports are provided and denoted as COM 1 and COM 2 in FIG. 3. The serial ports may comprise conventional hardware, such as DB9 connectors and associated hardware.

The serial ports COM 1 and COM 2 may be interfaced through a switch to the buffers for transportation to the various slots. The switch may include a bus controller for converting serial data to a parallel format for use by the microprocessor in the SAP.

The SAP may also include sensor circuitry for the monitoring of system functions. The SAP may be configured to sense a variety of conditions, including ambient temperature, card or specific component temperature, fan speed, chassis intrusion, and various voltage levels.

One important aspect of legacy application support is providing redundancy in the event of the failure of one of the SBCs present in the ICS. Since the SBCs are fully functional computers including hard drives, they are more prone to failure than other parts of the ICS. Additionally, as the SBCs host the system software; a failure may result in a crash of the ICS. To provide redundancy, many customers will choose to include at least two SBCs in an ICS. More SBCs may be provided as desired by the customer.

Figure 4:
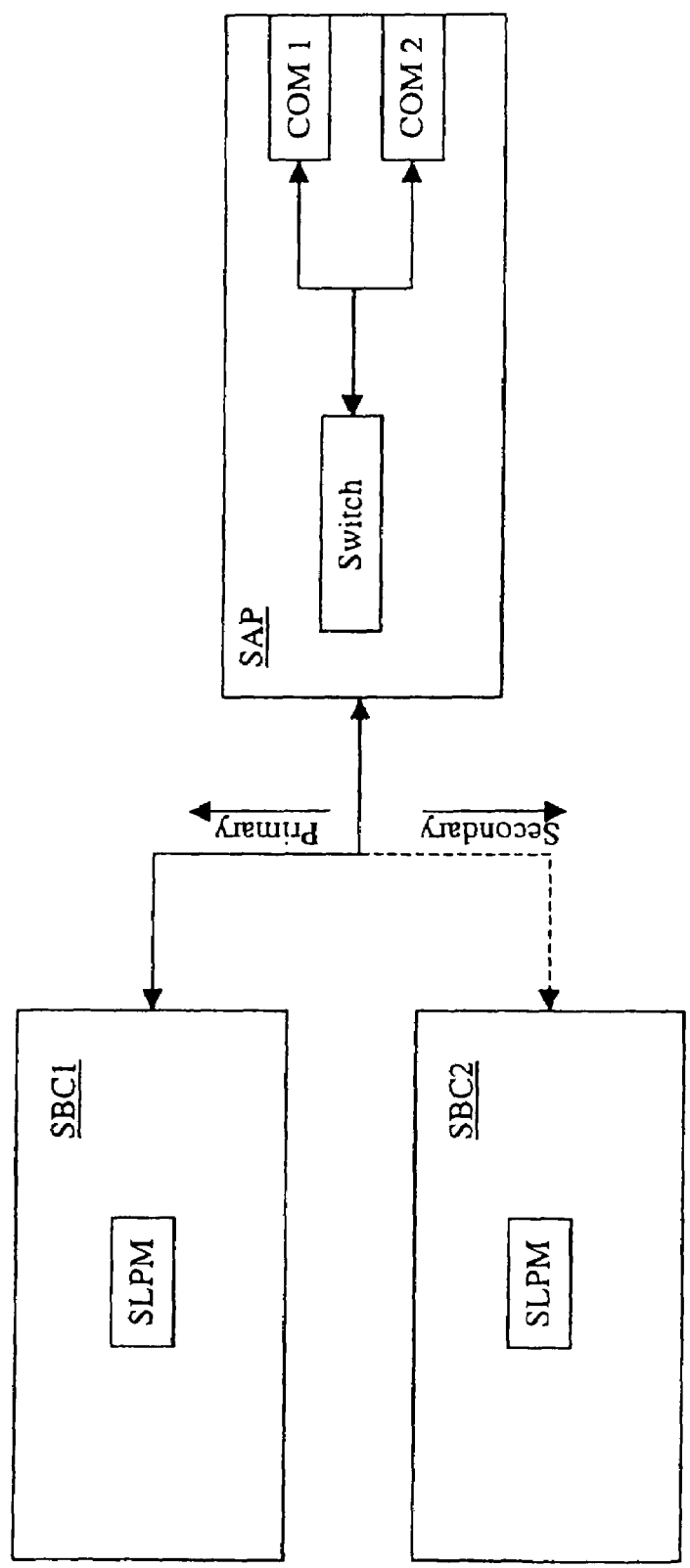
FIG. 4 is a schematic diagram of a fail-over system configured in accordance with this disclosure.

If two or more SBCs are present in an ICS, there is an opportunity to provide a fail-over redundancy system for serial communications. FIG. 4 is a schematic diagram of a fail-over system configured in accordance with this disclosure. FIG. 4 shows a SAP as disclosed above, focusing on the serial data processing elements of FIG. 3. FIG. 4 further includes two SBCs operatively coupled to the SAP.

In a preferred embodiment, each SBC will include a Serial Line Protocol Module ("SLPM") running on the SBCs operating system for implementing SLP.

The SLPM provides control of the serial ports COM 1 and COM 2, and is configured to provide the functionality of multiplexing multiple sessions between multiple SBCs and the SAP. The SLPM may comprise a Win32 DLL running under Windows 2000 on a SBC. A set of APIs may be provided to facilitate fault management utilizing the sensors described above. The commands sent by the SLPM will be referred to herein as SLP commands.

As is known by those skilled in the art, SLP may be implemented on any platform, such as Linux, Unix, Vxworks etc., which provides access to COM ports.

Thus, in a ICS of the present disclosure, the physical serial ports reside on the SAP, while their control is provided by the SBCs. This provides for additional reliability, because if the physical ports reside on a SBC and that SBC failed, serial data connectivity would be lost. In an ICS of the present disclosure, if a SBC fails which is controlling serial data connectivity, the serial data control may be passed to a secondary SBC without the need for physical intervention.

Referring still to FIG. 4, when there is more than one SBC present, the SAP will assign one SBC as the primary SBC. The primary SBC will then assume control of serial data connectivity in the ICS. In the event of the failure of the primary SBC control will be passed by the SAP from the primary SBC to a secondary SBC. Since the physical connectivity for the serial data is provided by the SAP, control of the serial data may be passed seamlessly between redundant SBCs present in the system.

Methods for passing control of serial data connectivity will now be disclosed in more detail.

Operation Overview

Power-Up Process

Figure 5:
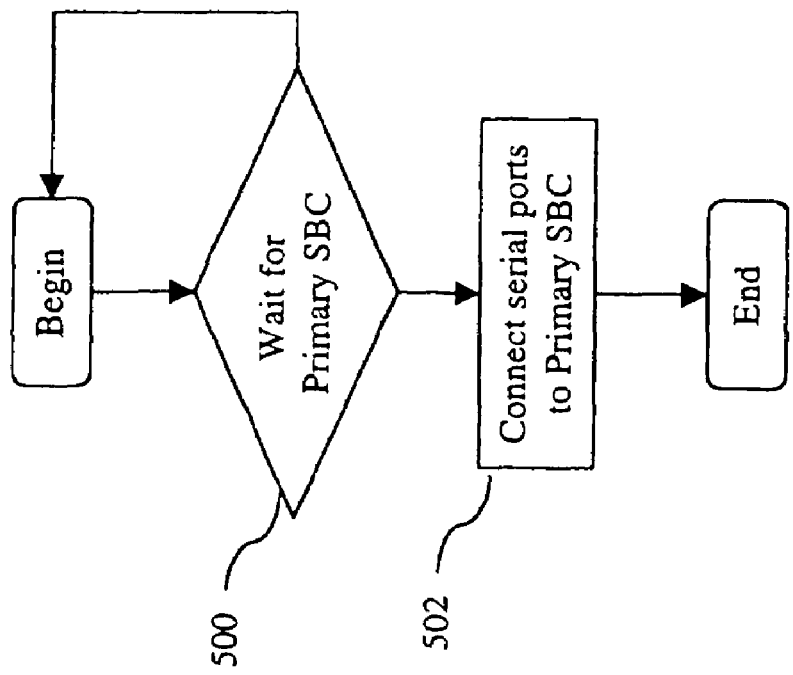
FIG. 5 is a flowchart of a power-up process performed by a SAP configured in accordance with this disclosure.

FIG. 5 is a flowchart of a power-up process performed by a SAP configured in accordance with this disclosure.

At power-up, the SAP will perform elementary start-up functions. In one embodiment, the microprocessor may access the FLASH memory and begin executing code. After executing the power-up process, the SAP may enter an idle state and wait for a Primary SBC declaration command from a SBC, as indicated by query 500.

If at least two SBCs are present in an ICS at power-up, the SBCs will establish amongst themselves which SBC will function as the Primary SBC. In a preferred embodiment, this process takes place through an arbitration process in which the last SBC to send a Master declaration message wins control of the ICS. The Master declaration message is a message in which a SBC declares "I am the Primary SBC". The last Master declaration received by the SAP will be from the Primary SBC which will control the ICS system. Such an arbitration protocol allows a second SBC to control if an initial Primary SBC hangs during the final power-up stages. The user may also determine which SBC should be the primary or system SBC.

In a preferred embodiment, the Primary declaration will originate from a "newly" assumed Primary Controller. The Primary & secondary SBCs may poll among themselves to elect who the Primary should be and later signal the SAP.

Once the SAP receives a Master declaration from a Primary SBC in query 500, the SAP will now know the identity of the Primary SBC, and the SAP will connect the serial ports to the Primary SBC in act 502.

Once the serial ports are connected to the Primary SBC, serial data connectivity may be accomplished between serial legacy applications and IP-based New World applications through the ICS of the present disclosure.

Figure 6:
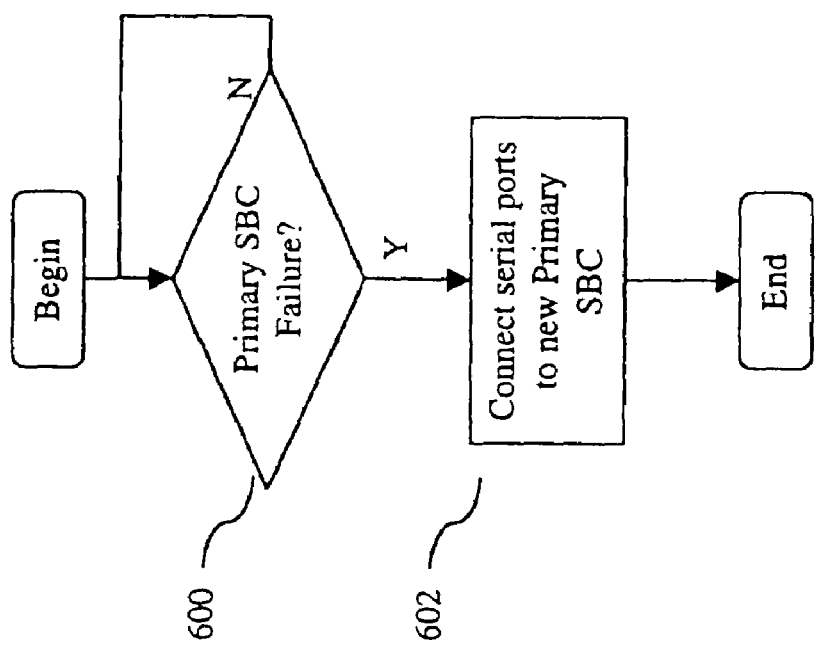
FIG. 6 is a flowchart of a further aspect of fail-over redundancy in accordance with the teachings of this disclosure.

FIG. 6 is a flowchart of a further aspect of fail-over redundancy in accordance with the teachings of this disclosure. In the event of a failure of the Primary SBC, serial data control must be passed to an available SBC. In FIG. 6, the SAP will monitor the system for a SBC failure, as shown in query 600. In a preferred embodiment, when a Primary SBC fails, any secondary SBC may declare as a new Primary SBC. The SBCs may arbitrate as described above.

If a new Primary SBC is declare, control of the serial data may be passed to the new primary SBC in act 602.

Figure 7:
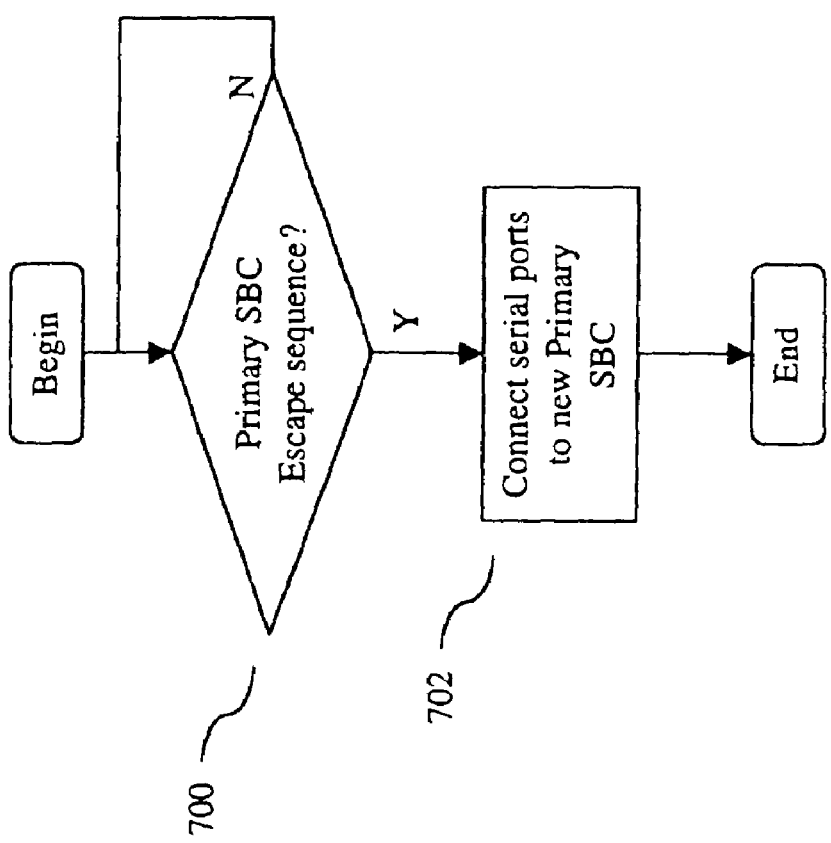
FIG. 7 is a flowchart of yet a further aspect of fail-over redundancy in accordance with the teachings of this disclosure.

FIG. 7 is a flowchart of a further aspect of fail-over redundancy in accordance with the teachings of this disclosure. It is contemplated that the Primary SBC may determine that is no longer capable of performing as a Primary SBC. In such a case, the SLP of the Primary SBC may issue an escape sequence. If the SAP receives an escape sequence, the SAP may preemptively assign a new Primary SBC, and pass serial connectivity control to the new Primary SBC.

In a preferred embodiment, a protocol is provided in which the header of a packet is marked with a escape sequence. Upon receipt of such as packet, the SAP may interpret the rest of the packet to decode the actual command. It is contemplated that through this mechanism, the SAP may be configured to set control of the COM ports to different entity than itself. For example, the SAP may be set to shift control of the COM ports to a remote 3rd party.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. An Integrated Communication System (ICS) with fail-over serial data connectivity comprising:
    a chassis including a System Switch Processor (SSP) for providing connectivity to a plurality of connections to processor cards;
    a Serial Alarm Processor (SAP) operatively coupled to said ICS through one of said connections to processor cards, said SAP further including at least one serial port for providing serial data connectivity;
    a Primary Single Board Computer (SBC) and at least one secondary SBC disposed in said connections to processor cards; and
    wherein said SAP is configured to pass control of serial data connectivity from said Primary SBC to one of said at least one secondary SBC in the event of the failure of said Primary SBC.

2. The ICS of claim 1, wherein said SAP is further configured to monitor the status of the ICS and provide real-time data to said Primary SBC.

3. The ICS of claim 1, wherein said SAP is further configured to monitor the operational status of each component of said ICS, and remotely alert system administrators of any environmental, functional, or operational problems detected within said ICS.

4. The ICS of claim 1, wherein said SAP further includes sensor circuitry for the monitoring of system functions.

5. The ICS of claim 4, wherein fault management is facilitated utilizing said sensor circuitry.

6. The ICS of claim 1, wherein said Primary SBC further includes a Serial Line Protocol Module ("SLPM") for implementing Serial Line Protocol.

7. The ICS of claim 6, wherein said SLPM provides control of said at least one serial port.

8. The ICS of claim 7, wherein said SLPM is further configured to multiplex multiple sessions between said SBCs and said SAP.

* * * * *